UNITED STATES PATENT OFFICE.

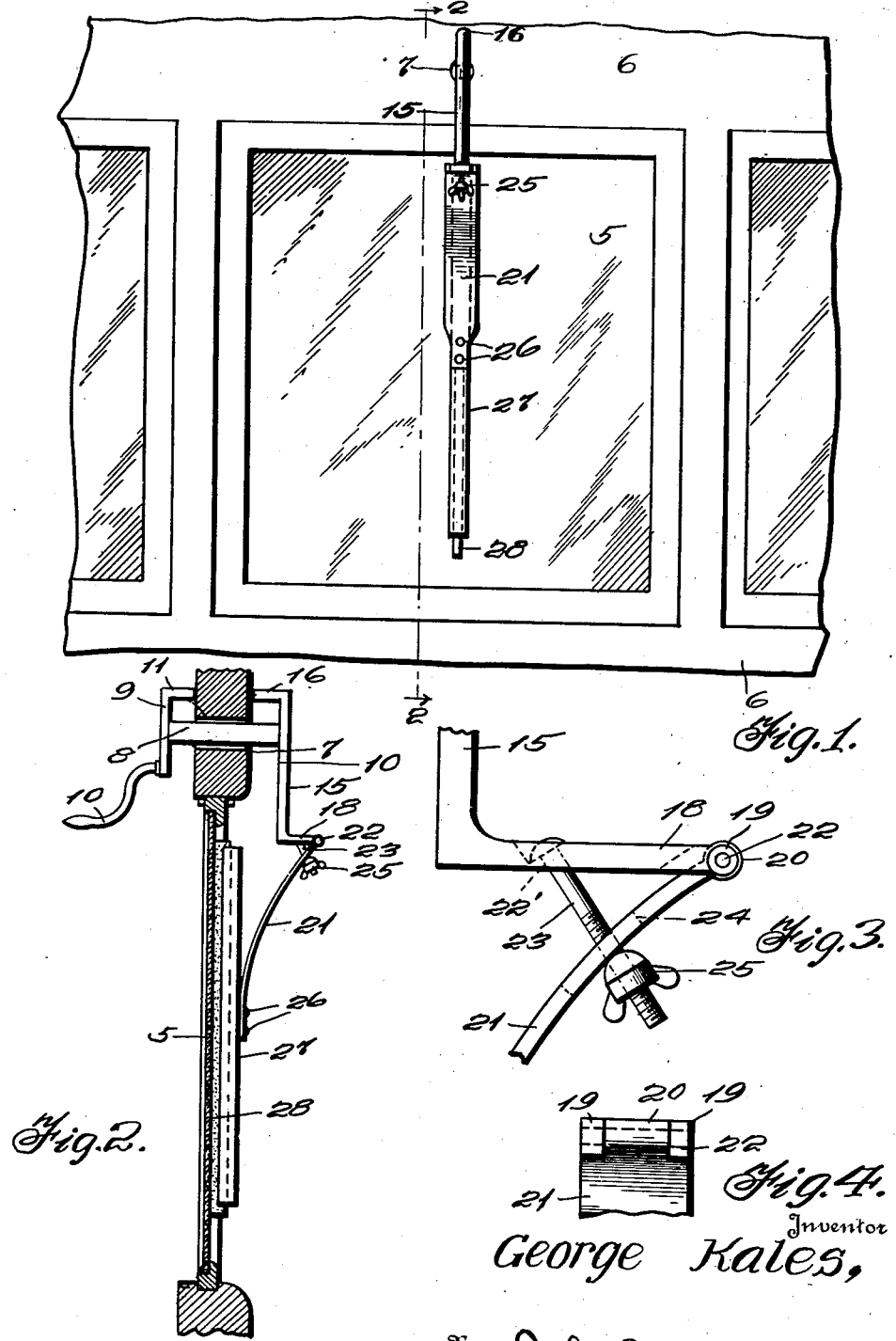

GEORGE KALES, OF HOQUIAM, WASHINGTON.

DEVICE FOR CLEANING PANES OF GLASS.

1,250,468.  Specification of Letters Patent.  Patented Dec. 18, 1917.

Application filed March 9, 1917.  Serial No. 153,637.

*To all whom it may concern:*

Be it known that I, GEORGE KALES, a citizen of the United States, residing at Hoquiam, in the county of Grays Harbor and State of Washington, have invented certain new and useful Improvements in Devices for Cleaning Panes of Glass, of which the following is a specification.

My invention relates to improvements in devices for cleaning panes of glass in street-cars, automobiles, or other vehicles.

An important object of the invention is to provide a device of the above mentioned character, which is characterized by its extremely simple construction and inexpensiveness to manufacture and which is adapted to successfully compete with more or less similar devices in a highly crowded art.

Other objects and advantages of the invention will be apparent during the course of the following description.

In the accompanying drawings forming a part of this specification and in which like numerals are employed to designate like parts throughout the same, Figure 1 is a front elevation of apparatus embodying the invention showing the same in use, Fig. 2 is a transverse sectional view taken on line 2—2 of Fig. 1, Fig. 3 is a side elevation of the connecting means between the spring arm and carriage, and, Fig. 4 is an end elevation of the same.

In the drawings, wherein for the purpose of illustration is shown a preferred embodiment of my invention, the numeral 5 designates a pane of glass to be cleaned, which is illustrated as carried by the front end or portion 6 of a street-car. The portion 6 of the street-car constitutes a support arranged above or near the pane of glass 5 and is provided with a preferably cylindrical opening 7, as shown.

Pivotally mounted within the opening 7 is a cylindrical member, support, or bar 8, to the inner end of which is rigidly secured a crank 9, provided at its lower end with a handle 10 for turning it. At the upper end the crank 9 carries a laterally extending finger 11, rigidly secured thereto, and slidably contacting with the support 6. Rigidly secured to the outer end of the member 8 is a crank 15, provided at its upper end with a laterally extending finger 16, rigidly secured thereto, and contacting with the support 6 in a slidable manner.

The material of the crank 15, at its lower end is flattened, providing a relatively wide portion 18, carrying ears or knuckles 19, receiving therebetween an ear or knuckle 20 formed upon a spring arm 21. A pintle 22 extends through the knuckles 19 and 20 and serves to pivotally connect them. As more clearly shown in Fig. 3, the flattened portion 18 is provided with an opening 22' for receiving the headed end of a bolt 23, extending through an elongated opening or slot 24, formed in the spring arm 21. The bolt 23 is provided at its outer end with a winged adjusting nut 25, having screw-threaded engagement therewith. The bolt 23 and its nut 25 serve to regulate the tension of the spring arm 21. Rigidly secured to the lower end of the spring arm 21, by means of bolts 26 is a back 27, carrying a squeegee blade 28, arranged to contact with the glass 5.

In the use of the apparatus, the operator grasps the handle 10, and by swinging the same turns the member 8. This movement of the member 8 swings the outer crank 15, thus moving the squeegee blade 28 across the pane of glass. The cranks or fingers 11 and 16 function to prevent the pivotal supporting portion of the apparatus from wabbling or partaking of improper movements. The spring arm 21 retains the squeegee blade 28 in proper contact with the surface of the glass 5, and as this squeegee blade moves with the crank 15, it cleans the glass. The tension of the spring arm 21 may be accurately and quickly adjusted by turning the winged nut 25, thereby causing the squeegee blade to exert different degrees of pressure upon the pane of glass.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:—

1. In apparatus of the character described, the combination with a support adapted to be arranged in proximity to a pane of glass and shifted with relation thereto, of a spring arm connected with the support, an adjusting device connecting the spring arm and support at a point remote from the first named connection between the spring arm and support and serving to regulate the tension of the spring arm, and a cleaner element carried by the spring arm to contact with the pane of glass.

2. In apparatus of the character described, the combination with a manually movable support, adapted to be pivoted near a pane of glass and including a crank; a spring arm having one end thereof pivotally connected with the crank and disposed at an angle with relation thereto, and provided at a point near and spaced from its pivot with a slot; a diagonally arranged member connected with the support and projecting through the slot of the spring arm; a nut having screw-threaded engagement with the diagonally arranged member and contacting with the spring arm; and a cleaner element carried by the opposite end of the spring arm and arranged to contact with the pane of glass.

3. In apparatus of the character described, the combination with a movable support adapted to be arranged near a pane of glass, of a spring arm having one end thereof pivotally connected with the support and disposed at an angle with relation thereto, a diagonally arranged member connected with the support and disposed adjacent the spring arm, a nut having screw-threaded engagement with the diagonally arranged member and contacting with the spring arm, and a cleaner element carried by the opposite end of the spring arm and arranged to contact with the pane of glass.

In testimony whereof I affix my signature in presence of two witnesses.

GEORGE KALES.

Witnesses:
E. BEELWOLD,
E. A. PHILBRICK.